2,816,126

PROCESS OF PREPARING DIALKYL SULFATES

Robert Evans, Tullahoma, Tenn., and Laurence Totherick Hogarth, Oxon Hill, Md., assignors to the United States of America as represented by the Secretary of the Navy No Drawing. Application September 20, 1951, Serial No. 247,542

5 Claims. (Cl. 260—459)

(Granted under Title 35, U. S. Code (1952), sec. 266)

The present invention relates generally to a process of preparing dialkyl sulfates by reacting the corresponding dialkyl ether with a dehydrating sulfate reactant; and in its specific embodiment it is principally concerned with the production of diethyl sulfate from diethyl ether, although not limited thereto.

In general the present invention contemplates reacting a dialkyl ether having the general structural formula $$R_1-O-R_2,$$

wherein $R_1$ and $R_2$ are alkyl radicals, with a dehydrating sulfate reactant such as fuming sulfuric acid, sulfuric anhydride, or concentrated sulfuric acid to produce a dialkyl sulfate having the general structural formula $$R_1-O-\underset{\underset{O}{\|}}{\overset{\overset{O}{\|}}{S}}-O-R_2$$

and removing the dialkyl sulfate from the reaction mixture as it is formed during the proceeding of the reaction. It has been found that although merely mixing a dialkyl ether, such as diethyl ether, with a dehydrating sulfate reactant as above-mentioned does produce the corresponding dialkyl sulfate when heated, the yield of this reaction in the case of the diethyl compound is very poor, making it commercially impractical. For example, in such a reaction, even when carried out in the presence of a dehydrating agent as phosphorous pentoxide or sodium sulfate to remove water formed in the reaction, the reaction is slow and the yield is usually well below 50 percent of the theoretical amount. In the absence of an efficient dehydrating agent the yield is even less, because the presence of water in the reaction mixture apparently leads to the decomposition of the diethyl sulfate formed. The poor yield of diethyl sulfate obtained by the mere reaction of diethyl ether with a dehydrating sulfate reactant in the presence of additional dehydrating agents is thought to be due to a number of side reactions which result in the formation of such by-products as ethylene, diethyl ether, ethionic acid, iso-ethionic acid, and in a partial reduction of sulfuric acid to sulfur dioxide. However, it has been found that by appropriately removing and isolating the diethyl sulfate product as it is formed in the diethyl ether sulfate reactant mixture above indicated during the proceeding of the reaction, the reaction rate and percentage yield may be enhanced considerably.

It is, therefore, one object of the present invention to provide a process for the manufacture of dialkyl sulfates from the corresponding ethers.

Another object of the present invention is to provide a process for the manufacture of a dialkyl sulfate from the reaction of a dialkyl ether with a dehydrating sulfate reactant.

Another object of the present invention is to provide a process for the manufacture of dialkyl sulfates, such as diethyl sulfate, from the reaction of the corresponding dialkyl ether with a dehydrating sulfate reactant, such as fuming sulfuric acid, sulfuric anhydride, or concentrated sulfuric acid.

Another object of the present invention is to provide for the manufacture of a dialkyl sulfate, such as diethyl sulfate, from the reaction of the corresponding dialkyl ether with a dehydrating sulfate reactant, such as fuming sulfuric acid, sulfuric anhydride, or concentrated sulfuric acid, wherein the dialkyl sulfate product is removed from the reaction mixture as it is formed during the proceeding of the reaction.

In its preferred embodiment, it is contemplated that a dialkyl ether, such as diethyl ether, and the dehydrating sulfate reactant when mixed together in a reaction vessel be placed in a closed system, that the reaction mixture be heated, and that gas be circulated and recirculated through the reaction mixture and through the system during the reaction for entraining the dialkyl sulfate produced. This system is further provided with a cold condenser, through which the circulating gas volatile components of the reaction mixture and entrained dialkyl sulfate pass, and within which the dialkyl sulfate is condensed from these gases and isolated therefrom. A trap is provided for receiving the condensed product. In order to maintain the pressure of this circulating system substantially constant, appropriate quantities of gas may be bled into it as needed to compensate for the removal of the product therefrom. In this reaction, one molecule of water is produced for each molecule of dialkyl sulfate, but the decomposing effect thereof on the sulfate product is minimized first by the dehydrating action of the sulfate reactant and second by the continuous removal of the dialkyl sulfate from the reaction mixture. Although small quantities of by-products the precise identification of which is not known, are frequently present in the dialkyl sulfate product, they can be readily separated mechanically therefrom as will be apparent to those skilled in the art.

As one specific example of the present process, a reaction mixture of diethyl ether and 30 percent fuming sulfuric acid is prepared in the approximate ratio of 105.7 grams of ether to 200 grams of acid by dropping the acid into the ether. It is desirable in compounding this reaction mixture that the temperature thereof not be allowed to rise appreciably, and preferably should not exceed about 15 degrees centigrade. The reaction mixture is then introduced into the gas circulating system described above. An inert gas, such as nitrogen, is continuously circulated and recirculated through the reaction mixture by bubbling and passing through the closed circulating system. The temperature of the reaction mixture is brought approximately to the temperature range of 95 to 100 degrees centigrade and thus maintained during the reaction. As the diethyl sulfate product is formed in the reaction mixture, the circulation of the inert gas and the volatile components of the reaction mixture through the reaction mixture and the closed system entrain the product present in the reaction vessel substantially as it is formed and carry it over into the cold condenser, where it is condensed out of the gas and collected in the trap provided therefor. If desired, the present process may be carried out continuously instead of in batches by providing a second reaction mixture of diethyl ether and 30 percent fuming sulfuric acid, in the approximate ratio of 161.2 grams of ether to 200 grams of acid, prepared in the manner indicated above for the initial reaction mixture, and adding this replenishing mixture to the initial reaction mixture at a rate approximately equal to that at which the diethyl sulfate is formed. It is preferable that during the reaction, when employing the batch process, additional nitrogen be added to the circulating system sufficient to maintain the pressure thereof despite the removal of the diethyl sulfate product. It has been found that yields of diethyl sulfate based on the weight of the replenishing solution added in the continuous process are above 50 percent of the theoretical yield per hour.

The foregoing detailed description of the present invention is presented merely by example, and modifications thereof, as will be apparent to those skilled in the art, which are within the spirit and scope of the appended claims are within the contemplation of the present patent. For example, the scope of the present invention is not limited to the production of diethyl sulfate from diethyl ether, but other dialkyl sulfates may be produced from the corresponding ethers. Also, other modes than that specifically described for isolating the product may be employed.

The invention described herein may be manufactured and used by or for the Government of the United States of America for governmental purposes without the payment of any royalties thereon or therefor.

What is claimed is:

1. The process of preparing diethyl sulfate comprising reacting diethyl ether with a reactant chosen from the group consisting of concentrated sulfuric acid, fuming sulfuric acid, and sulfuric anhydride, circulating an inert gas through the reaction mixture during the proceeding of the reaction to entrain and immediately remove all of the diethyl sulfate product as it is formed, and condensing said product from said entraining gas separately from said reaction mixture.

2. The process of preparing a dialkyl sulfate comprising reacting the corresponding dialkyl ether with a dehydrating sulfuric acid reactant, passing an inert gas through the reaction mixture during the proceeding of the reaction to entrain and immediately remove all of the dialkyl sulfate product as it is formed, and condensing said product from said entraining gas separately from said reaction mixture.

3. The process of preparing diethyl sulfate comprising reacting diethyl ether with a reactant chosen from the group consisting of concentrated sulfuric acid, fuming sulfuric acid, and sulfuric anhydride, circulating an inert gas through the reaction mixture during the proceeding of the reaction to entrain and immediately remove all of the diethyl sulfate product as it is formed, condensing said product from said entraining gas isolated from said reaction mixture, and adding a replenishing reaction mixture comprising said diethyl ether and said reactant to the initial reaction mixture at a rate substantially corresponding to the rate of formation of said product.

4. The process of preparing diethyl sulfate comprising reacting diethyl ether with a dehydrating sulfuric acid reactant, circulating an inert gas through the reaction mixture during the proceeding of the reaction to entrain and immediately remove all of the diethyl sulfate product as it is formed, condensing said product from said entraining gas isolated from said reaction mixture, and adding a replenishing reaction mixture comprising diethyl ether and a dehydrating sulfuric acid reactant to the initial reaction mixture during the proceeding of the reaction.

5. The process of preparing a dialkyl sulfate comprising reacting the corresponding dialkyl ether with a dehydrating sulfuric acid reactant, circulating an inert gas through the reaction mixture during the proceeding of the reaction to entrain and immediately remove all of the dialkyl sulfate product as it is formed, condensing said product from said entraining gas apart from said reaction mixture, and adding a replenishing reaction mixture comprising said dialkyl ether and dehydrating sulfuric acid reactant to the initial reaction mixture during the proceeding of the reaction.

References Cited in the file of this patent

UNITED STATES PATENTS 1,401,693     Haworth et al.     Dec. 27, 1921